(12) United States Patent
Cady (10) Patent No.: US 9,744,564 B2
(45) Date of Patent: Aug. 29, 2017

(54) VIBRATORY SEPARATOR SCREEN (71) Applicant: M-I L.L.C., Houston, TX (US)

(72) Inventor: Eric Cady, Florence, KY (US)

(73) Assignee: M-I L.L.C., Houston, TX (US)

(*) Notice: Subject to any disclaimer, the term of this patent is extended or adjusted under 35 U.S.C. 154(b) by 0 days.

(21) Appl. No.: 14/407,127

(22) PCT Filed: Jun. 11, 2013

(86) PCT No.: PCT/US2013/045249
§ 371 (c)(1),
(2) Date: Dec. 11, 2014

(87) PCT Pub. No.: WO2013/188451
PCT Pub. Date: Dec. 19, 2013

(65) Prior Publication Data
US 2015/0158054 A1    Jun. 11, 2015

Related U.S. Application Data (60) Provisional application No. 61/658,175, filed on Jun. 11, 2012.

(51) Int. Cl.
*B07B 1/00* (2006.01)
*B07B 1/46* (2006.01)
(Continued)

(52) U.S. Cl.
CPC ........ *B07B 1/4663* (2013.01); *B01D 33/0376* (2013.01); *B07B 1/04* (2013.01);
(Continued)

(58) Field of Classification Search
CPC  B07B 1/4663; B07B 1/04; B07B 1/46; B07B 1/4609; B07B 1/4618; B07B 1/4645; B01D 33/0376
(Continued)

(56) References Cited

U.S. PATENT DOCUMENTS 4,237,000 A    12/1980  Read et al.
4,728,422 A     3/1988  Bailey
(Continued)

FOREIGN PATENT DOCUMENTS

WO    0025890       5/2000
WO    2005077551    8/2005
WO    2013188451    12/2013

OTHER PUBLICATIONS

International Search Report and Written Opinion issued in PCT/US2013/045249 on Sep. 25, 2013, 34 pages.
(Continued)

*Primary Examiner* — Joseph C Rodriguez
*Assistant Examiner* — Kalyanavenkateshware Kumar
(74) *Attorney, Agent, or Firm* — David J. Smith (57) ABSTRACT A vibratory separator includes a screen frame having an upper screen surface and a plurality of openings and a first screen insert disposed in a first opening of the plurality of openings of the screen frame, the screen insert having a screen surface positioned at a first height above the supper screen surface. The vibratory separator also includes a second screen insert disposed in a second opening of the plurality of openings of the second screen frame, wherein a screen surface of the second screen insert is positioned at a second height. The second height may be different from the first height. A method of processing fluid includes providing a flow of fluid to a vibratory separator, and flowing the fluid over a screen having a first screen insert positioned at a first height.

13 Claims, 8 Drawing Sheets (51) Int. Cl.
*B07B 1/04* (2006.01)
*B07B 1/40* (2006.01)
*B01D 33/03* (2006.01)
*B07B 1/36* (2006.01)

(52) U.S. Cl.
CPC .................. *B07B 1/36* (2013.01); *B07B 1/40* (2013.01); *B07B 1/46* (2013.01); *B07B 1/4609* (2013.01); *B07B 1/4618* (2013.01)

(58) Field of Classification Search
USPC .......................... 209/363, 395, 397, 403, 405
See application file for complete search history.

(56) References Cited

U.S. PATENT DOCUMENTS

| | | | |
|---|---|---|---|
| 5,137,622 A | | 8/1992 | Souter |
| 5,221,008 A | | 6/1993 | Derrick, Jr. et al. |
| 5,690,826 A | | 11/1997 | Cravello |
| 5,720,881 A | | 2/1998 | Derrick et al. |
| 5,816,413 A | * | 10/1998 | Boccabella ........... B07B 1/4672 209/399 |
| 5,958,236 A | | 9/1999 | Bakula et al. |
| 6,029,824 A | | 2/2000 | Adams |
| 6,269,953 B1 | | 8/2001 | Seyffert et al. |
| 6,443,310 B1 | | 9/2002 | Schulte, Jr. et al. |
| 6,675,975 B1 | | 1/2004 | Cook et al. |
| 7,011,218 B2 | | 3/2006 | Colgrove et al. |
| 7,896,162 B2 | | 3/2011 | Bailey |
| 2004/0074821 A1 | * | 4/2004 | Russell ................. B07B 1/4618 209/405 |
| 2004/0099578 A1 | | 5/2004 | Winkler et al. |
| 2005/0000865 A1 | | 1/2005 | Schulte et al. |
| 2007/0108107 A1 | | 5/2007 | Morrow |
| 2008/0314804 A1 | * | 12/2008 | Wojciechowski ........ B07B 1/30 209/243 |
| 2010/0276343 A1 | | 11/2010 | Hukki |
| 2011/0094950 A1 | | 4/2011 | Dahl |
| 2011/0253602 A1 | | 10/2011 | Lipa et al. |

OTHER PUBLICATIONS

Canadian Office Action for corresponding Canadian Application No. 2,876,340, dated Jan. 14, 2016, 4 pages.
Extended European Search Report for corresponding European Application Serial No. 13803459.0, dated Jan. 7, 2016, 8 pages.
International Search Report and Written Opinion issued in International Patent Application No. PCT/US2014/069202 on Mar. 26, 2015; 16 pages.
Office action for the related U.S. Appl. No. 14/102,237 dated May 19, 2017.

* cited by examiner

VIBRATORY SEPARATOR SCREEN

BACKGROUND

Vibratory separators are used to separate solid particulates of different sizes and/or to separate solid particulate from fluids. Vibratory separators may be used in the oil and gas industry, in which they are often referred to as shale shakers. Shale shakers or vibratory separators are used to remove cuttings and other solid particulates from drilling mud returned from a wellbore. A shale shaker is a vibrating sieve-like table upon which returning used drilling mud is deposited and through which substantially cleaner drilling mud emerges. The shale shaker may be an angled table with a generally perforated filter screen bottom. Returning drilling mud is deposited at one end of the shale shaker. As the drilling mud travels toward the opposite end, the fluid falls through the perforations to a reservoir below, thereby leaving the solid particulate material behind.

Vibratory separators may also be used in the food industry, cleaning industry, waste water treatment, and others. In general, the size of a shaker screen may be pre-determined by the size of the shaker basket which is generally determined by the size of the shaker footprint. It may be desirable to maximize the amount of fluid capacity that a shaker has (i.e., the number of gallons/minute of drilling fluid/mud that a shaker can process). The higher fluid capacity a shaker has, the fewer shakers and screens may be used to maintain drilling operations. Because the size of the screen is often pre-determined, the screening area of a two dimensional pre-tensioned screen is generally also pre-determined. For example, the maximum screen area for a 2 foot by 4 foot screen is 8 square feet. In addition, the wire mesh is bonded to the screen frame so that the area of the screen where the wire mesh is bonded becomes blocked off and the effective open or non-blanked screen area is less than 8 square feet, using the example above. The wire mesh may also decrease the non-blanked area so that the effective screening area of the 8 square foot screen may be reduced by more than 50%. Despite many valuable contributions from the art, it would be beneficial to develop systems and methods that efficiently process fluids, including oil-based return drilling fluids.

DETAILED DESCRIPTION

The following is directed to various exemplary embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment. Specifically, while embodiments disclosed herein may reference shale shakers or vibratory separators used to separate cuttings from drilling fluids in oil and gas applications, one of ordinary skill in the art will appreciate that a vibratory separator (or vibratory shaker) and its component parts as disclosed herein and methods disclosed herein may be used in any industrial application. For example, vibratory separators in accordance with embodiments disclosed herein may be used in the food industry, cleaning industry, waste water treatment, and others.

Certain terms are used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component is coupled to a second component, that connection may be through a direct connection, or through an indirect connection via other components, devices, and connections. Further, the terms "axial" and "axially" generally mean along or parallel to a central or longitudinal axis, while the terms "radial" and "radially" generally mean perpendicular to a central longitudinal axis.

Additionally, directional terms, such as "above," "below," "upper," "lower," etc., are used for convenience in referring to the accompanying drawings. In general, "above," "upper," "upward," and similar terms refer to a direction toward the earth's surface from below the surface along a borehole, and "below," "lower," "downward," and similar terms refer to a direction away from the surface along the borehole, i.e., into the borehole, but is meant for illustrative purposes, and the terms are not meant to limit the disclosure.

Embodiments disclosed herein relate generally to vibratory separators. In one aspect, embodiments disclosed herein relate to a vibratory separator including a screen frame having a first screening surface disposed above a second screening surface. In other words, a single screen frame includes a two-tier screening surface. The two-tier screening surface may be integrally formed with the screen frame or one or both of the two tiers of the screening surface may be coupled to the screen frame. In some embodiments, the first screening surface may be coupled to the second screening surface or may be coupled to the screen frame.

In another aspect, embodiments disclosed herein relate to a vibratory separator including a screen frame having an upper screen surface and a plurality openings, and a screen insert disposed in a first opening of the plurality of openings of the screen frame, the screen insert having a screen surface positioned at a first height above the upper screen surface of the screen frame.

In another aspect, embodiments disclosed herein relate to a vibratory separator including a screen frame having one or more openings, a first screen insert disposed in the one or more openings of the screen frame, wherein a screen surface of the first screen insert is positioned at a first height, a second screen insert disposed in the one or more openings of the screen frame, wherein a screen surface of the second screen insert is positioned at a second height. Specifically, the first height may be positioned above an upper screen surface of the screen frame and the second height may be positioned above the first height.

In another aspect, embodiments disclosed herein relate to a method of processing a fluid, the method including providing a flow of drilling fluid to a vibratory separator, and flowing the fluid over a screen having a first screen insert positioned at a first height. In some embodiments, the fluid may be a drilling fluid, waste water fluid, or other fluids containing particulate matter therein.

More particularly, embodiments disclosed herein relate to screens for vibratory shakers. In one aspect, embodiments disclosed herein relate to vibratory shakers with a two-tier screening surface. In other embodiments, a vibratory shaker may include a three or more tier screening surface. Such multi-tier screening surfaces may provide an increased screening area, which increases the effective processing capacity of the shaker. For instance, the screen inserts described herein may be adjusted based on a desired effective processing capacity of the shaker.

Figure 1:
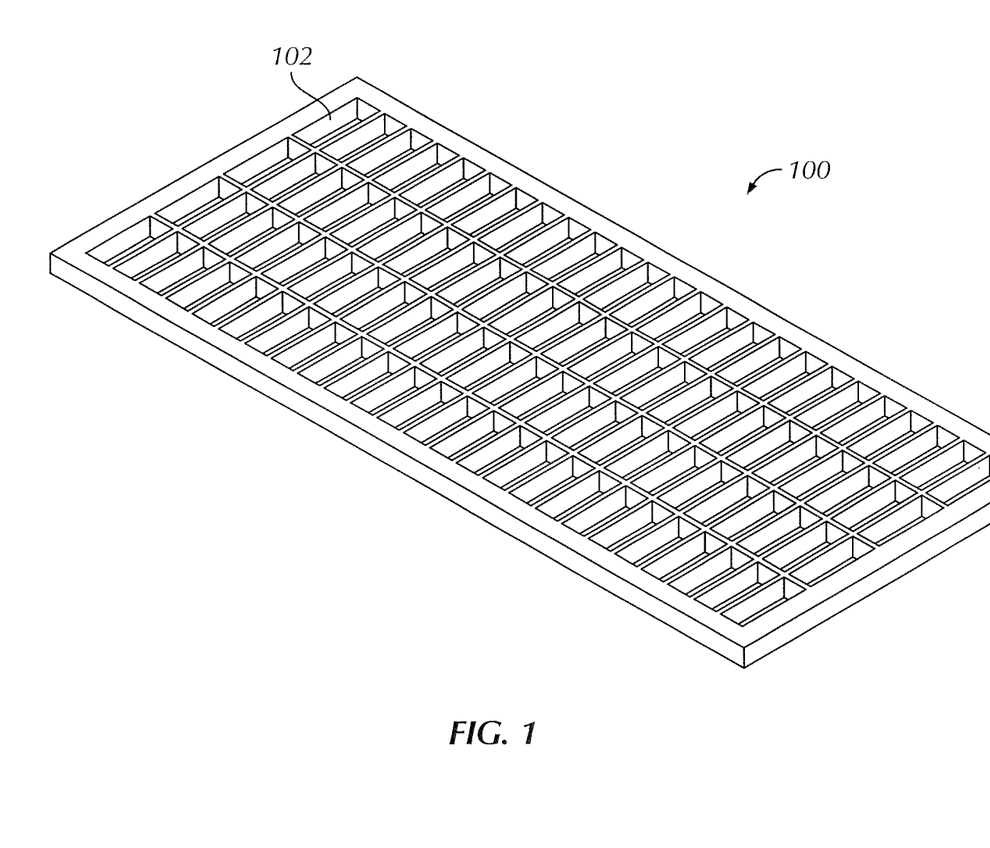
FIG. 1 shows a perspective view of a screen frame in accordance with one or more embodiments of the present disclosure.
Figure 2A:
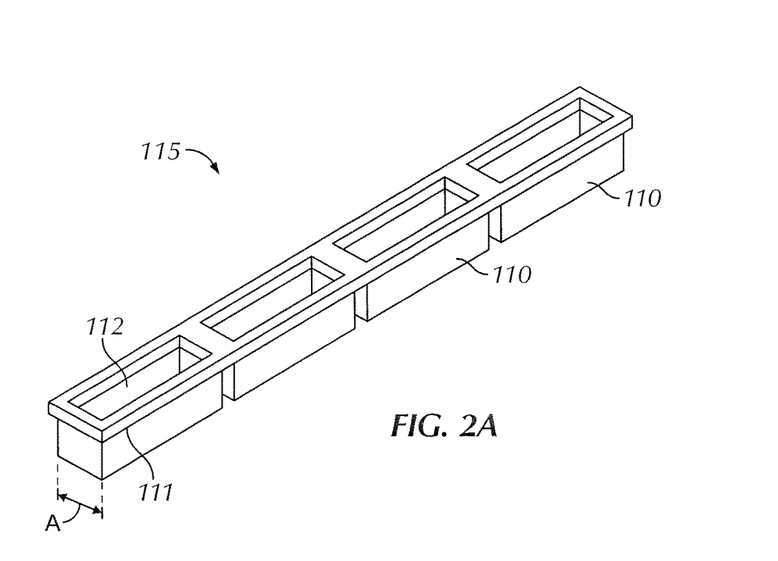
FIGS. 2A and 2B show perspective views of screen inserts in accordance with one or more embodiments of the present disclosure.
Figure 2B:
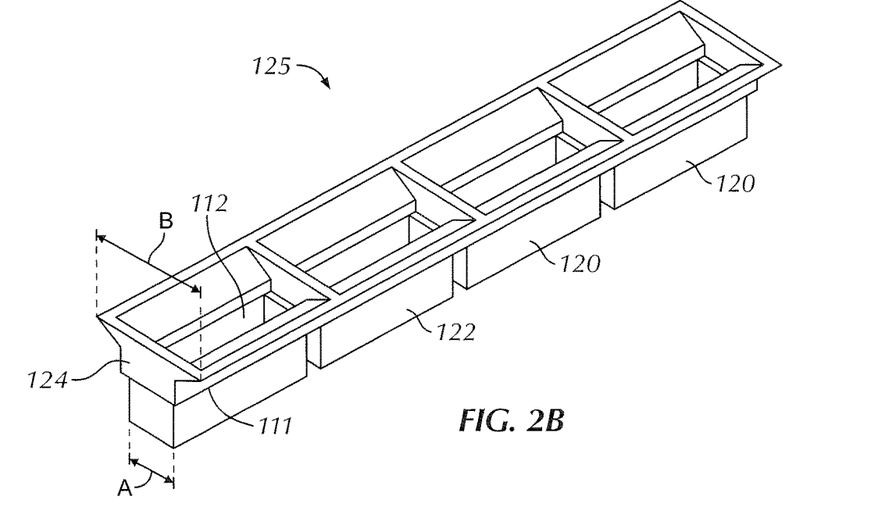
Figure 3A:
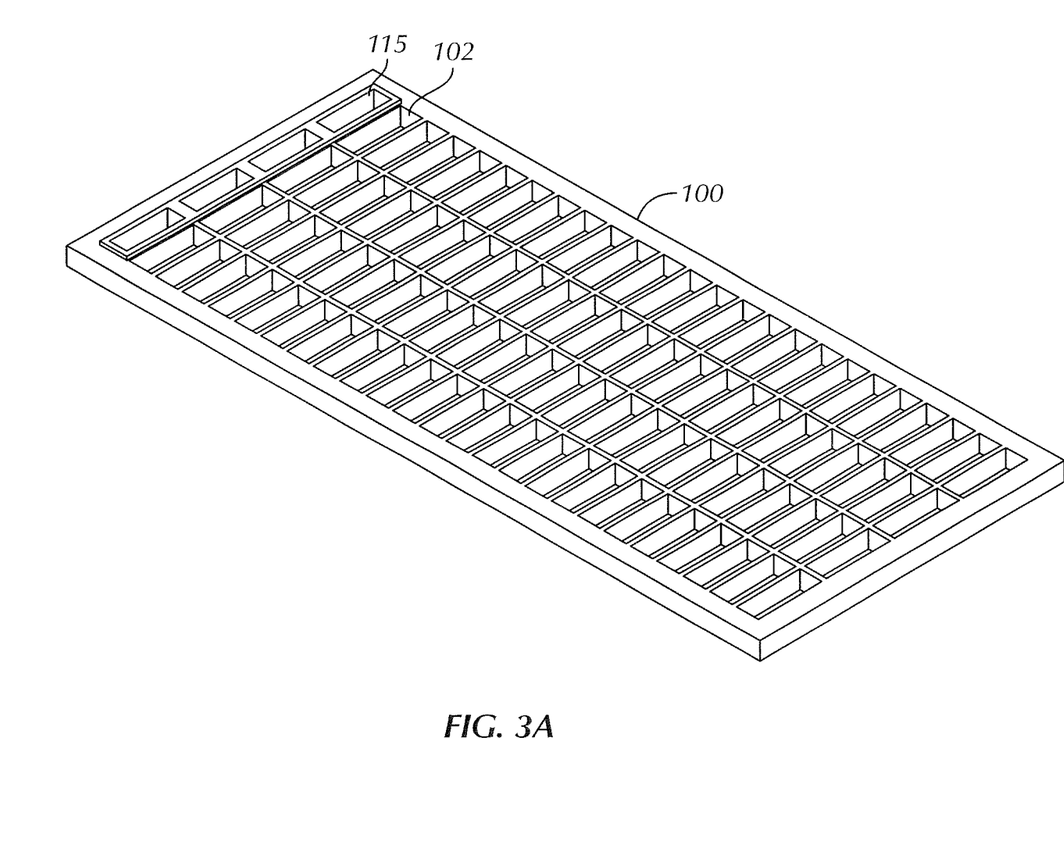
FIGS. 3A and 3B show perspective views of a screen frame with screen inserts installed in accordance with one or more embodiments of the present disclosure.
Figure 3B:
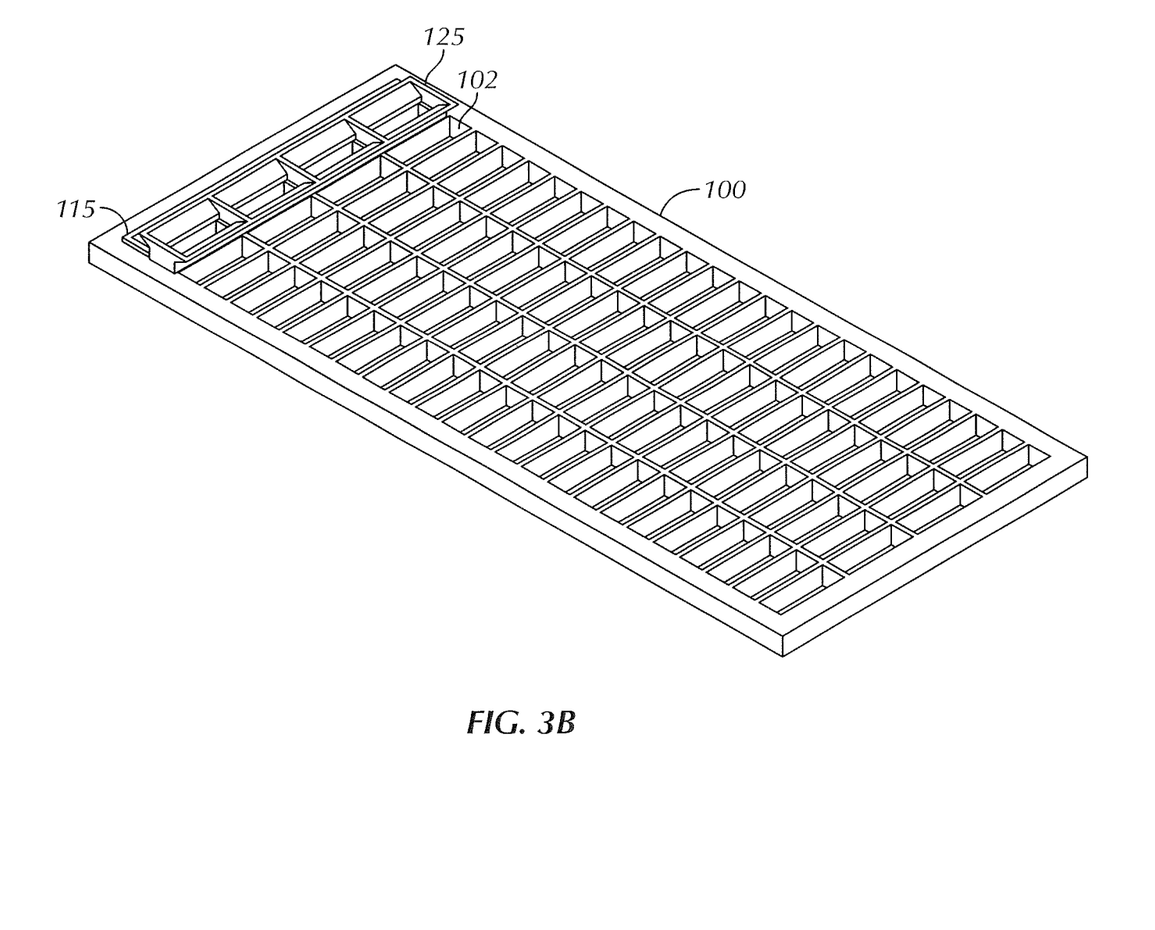

Referring initially to FIGS. 1, 2A, and 2B, a composite screen frame 100 and screen inserts 110 and 120 in accordance with one or more embodiments of the present disclosure are shown. The composite screen frame 100 is configured to be attached to a shaker frame (not shown) as will be understood by one of ordinary skill in the art. The screen frame 100 is formed having a number of individual openings or cells 102 into which first screen inserts 110 and second screen inserts 120 are configured to be inserted. Although screen frame 100 is described as a composite screen frame, one of ordinary skill in the art will appreciate that other types of screen frames may be used without departing from the scope of embodiments disclosed herein.

The first screen inserts 110 and second screen inserts 120 may be integrally molded inserts having a central opening 112 therethrough. The screen inserts 110 and 120 may have a ridge or lip 111 formed around an outer periphery of the screen insert that is configured to contact a surface of the screen frame 100. The lip 111 is configured to prevent the screen inserts 110 and 120 from falling through the cells 102 in the screen frame 100 when the screen inserts are installed. In certain embodiments, and as shown in the figures, the inserts 110 and 120 may be generally rectangular-shaped units. In other embodiments, the inserts 110 and 120 may be shaped to correspond with the shape of the openings or cells 102 in the screen frame, including but not limited to circular, triangular, and other known shapes.

The first screen inserts 110, shown in FIG. 2A, may be configured as individual screen inserts 110 which are configured to be inserted individually into cells 102 of the screen frame 100. Similarly, the second screen inserts 120, shown in FIG. 2B, may be configured as individual screen inserts 120 which are configured to be inserted individually into cells 102 of the screen frame 100. In certain embodiments, individual first screen inserts 110 may be fastened or coupled together to form a larger screen modular unit 115 (shown in FIG. 2A) which includes multiple individual first screen inserts 110. Likewise, individual second screen inserts 120 may be fastened or coupled together to form a larger screen modular unit 125 (shown in FIG. 2B) which includes multiple individual second screen inserts 120. In some embodiments, a modular unit 115 may include multiple individual first screen inserts integrally formed as a single unit.

For example, as shown in FIG. 2A, in certain embodiments, four individual first screen inserts 110 may be fastened together. In other embodiments, ten or more first screen inserts 110 may be combined to form a large modular unit of first screen inserts 110. For example, individual first screen inserts 110 may be combined such that there are between two and five individual first screen insert units installed in cells 102 of the screen frame 100. Likewise, ten or more second screen inserts 120 may be combined together to form a large modular unit of second screen units 120. Still further, modular units including both individual first screen units 110 and individual second screen units 120 may be formed.

The second screen inserts 120 are taller and about twice as wide as the first screen inserts 110. An upper portion 124 of the second screen inserts 120 may be formed having a generally Y-shaped configuration, which provides an increased width and a larger screening area, and results in the potential for higher effective fluid processing capacity than the first screen inserts 110. In other embodiments, the upper portion 124 of the second screen inserts 120 may be formed having a T-shape, U-shape, W-shape, or other shape configurations. A lower portion 122 of the second screen insert 120 has a width that corresponds with a width of the cell 102 (FIG. 1) into which the insert 120 is installed. The widened upper portion 124 thereby provides increased screening area.

The insert 120 also includes a sloped portion extending between the widened upper portion 124 and the lower portion 122. The sloped portion may ensure that fluid does not get trapped inside the insert 120 after passing through the widened upper portion 124 or a mesh screen attached to the top surface of the upper portion 124, as discussed below. As shown, the insert 120 may include two sloped portions, i.e., two sides of the insert are sloped. However, one of ordinary skill in the art will appreciate that only one side is sloped or that each side of the insert extending from the upper portion 124 to the lower portion 122 is sloped. Further, one of ordinary skill in the art will appreciate that an angle of the sloped portion(s) may vary depending on, for example, the desired screening surface area of the insert 120, the width of the upper portion 124 of the insert, the width of the lower portion 122 of the insert, the width of the a cell 102 in which the insert is inserted, the desired or expected flow rate of material to be separated, etc. The angle of the sloped portion may be between, for example, 10 degrees and 80 degrees. In some embodiments, the angle of the sloped portion may be between 30 degrees and 60 degrees. In yet other embodiments, the angle of the sloped portion may be between 10 degrees and 50 degrees or between 25 degrees and 75 degrees. One of ordinary skill in the art will appreciate that the sloped portion may be of any degrees based on a given application. The angle of the sloped portion of one side of the insert may be equal to or different than the angle of the sloped portion of another side of the same insert. Inserts in a modular unit may have the same or varying angles of sloped portions.

Figure 5:
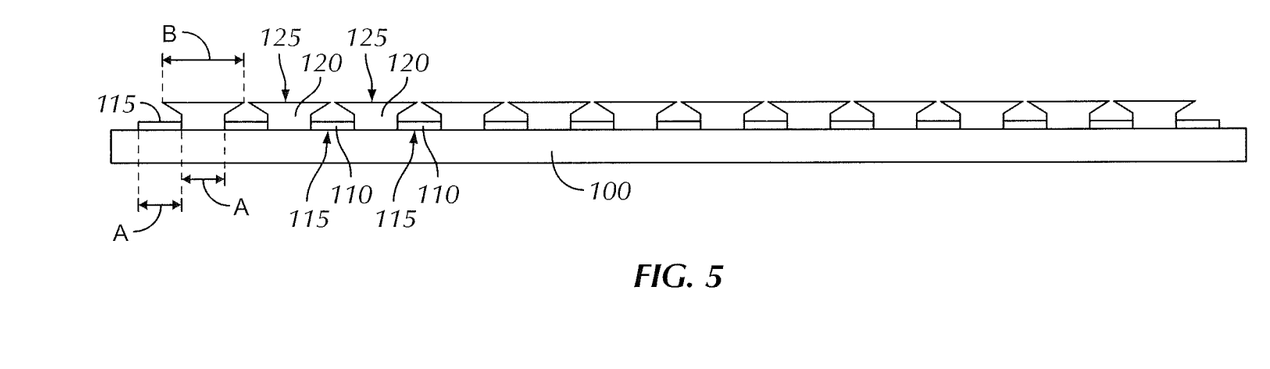
FIG. 5 shows a cross-section view of a screen with alternating screen inserts installed in accordance with one or more embodiments of the present disclosure.

Furthermore, in certain embodiments, the top surfaces of the second screen inserts 120 may be positioned above the top surfaces of the first screen inserts 110. For example, in certain embodiments a distance of between about between about 1-2 inches may exist between the top surface of the second screen insert and the top surface of the first screen insert. In other embodiments, the top surfaces of the second screen inserts 120 may be positioned between about 2-5 inches above the top surfaces of the first screen inserts. As shown in FIG. 5, by positioning the second screen inserts 120 (e.g., modular unit 125) at a height above and overlapping the first screen inserts 110 (e.g., modular unit 115), the second screen insert 120 (modular unit 125) may act as a funnel to channel more fluid through the frame 100 as fluid passes through both the first and second screen inserts 110 (modular unit 115) and 120 (modular unit 125).

Methods of installing the screen inserts 110 and 120 in the screen frame 100 are described in reference to FIGS. 3A-5. The first screen inserts 110 may be installed into one or more cells 102 of the screen frame 100 and fastened in the screen frame 100. Subsequently, the second screen inserts 120 may be installed into cells 102 in the screen frame 100 which do not have first inserts 110 installed therein. For example, one or more of the second screen inserts 120 may be installed adjacent to first screen inserts 120. In certain embodiments, the first and second screen inserts 110 and 120 may be arranged in an alternating pattern along a length of the screen frame 100 (shown in FIG. 5). Other methods of installation may include installing the first screen inserts 110 initially, followed by installation of the second screen inserts 120. The first and second screen inserts 110 and 120 may be installed and secured to the screen frame 100 using any number of methods for installing and fastening the screen inserts to the frame.

For example, the screen inserts 110 and 120 may be insert-molded with the screen frame 100. Other methods include using snap lock ridges to retain the first and second screen inserts 110 and 120 to the screen frame 100. In other embodiments, screws or similar mechanical fasteners may be used. Likewise, the first and second screen inserts 110 and 120 may be glued, welded, or otherwise attached to the screen frame 100 using chemical adhesives, thermal bonding, etc. In some embodiments, the first screen inserts 110 may be molded with the screen frame 100, while the second inserts 120 may be separately coupled to the screen frame 100 using, for example, mechanical fasteners, adhesives, bonding, etc. The first screen inserts 110 may be initially formed or molded with the screen frame 100, or the first screen inserts 110 may be molded to the screen frame 100. In still other embodiments, the first and second inserts 110, 120 may molded to or with the screen frame 100.

Other attachment methods include using two-piece screen inserts (not shown) rather than single piece inserts (as shown in FIGS. 2A and 2B). The two-piece screen inserts include separable top and bottom portions that may be fastened or coupled together to form a single screen insert. The top portion of the screen insert may be installed in the top portion of a cell 102 of the screen frame 100, and the bottom portion of the screen insert may be installed in the bottom of the same cell 102 in the screen frame 100. The top and bottom portions of the two-piece screen insert may then be fastened together in the cell 102 to form a single screen insert. For example, the top and bottom portions of the screen insert may be fastened together with mechanical fasteners, adhesives, thermal bonding, etc. In addition, fastening the top and bottom portions of the screen insert within the cell 102 effectively secures the two-piece screen insert within the screen frame 100.

In still further embodiments, the first and second inserts may be configured having a slot or dovetail shape which would allow for horizontal installation (rather than vertical installation). For example, the dovetail configuration of the first and second screen inserts may correspond with a dovetail slot formed in the screen frame and into which the first and second inserts may be installed.

Figure 4:
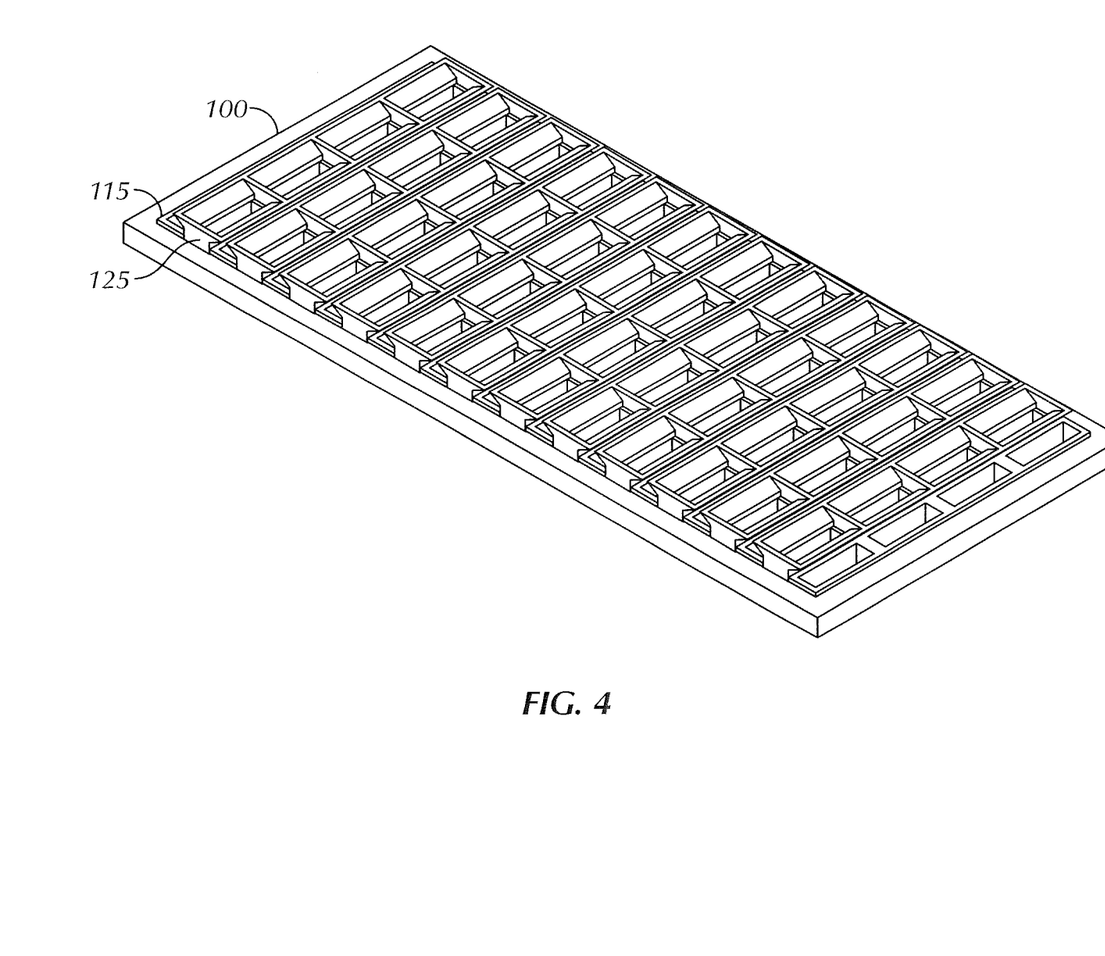
FIG. 4 shows a perspective view of a screen frame with alternating screen inserts installed in accordance with one or more embodiments of the present disclosure.

FIGS. 4 and 5 show an alternating arrangement of the first screen inserts 110 and second screen inserts 120 installed in the screen frame 100 in accordance with one or more embodiments of the present disclosure. The alternating arrangement of the first and second screen inserts 110 and 120 provides a composite screen having alternating short and tall screen inserts 110 and 120 installed therein. In other embodiments, rather than having every second row having a second screen insert 120 (i.e., taller screen insert), every third, fourth, or fifth row of cells may have the second or taller screen insert 120 installed.

Arrangement of the first and second screen inserts 110 and 120 may be adjusted based on the effective fluid flow rate. For example, when there is a higher fluid flow rate second screen inserts 120 may be installed in every other row in an alternating fashion with the first screen inserts 110 as shown in FIGS. 4 and 5. In other embodiments, also for a higher flow rate, second screen inserts 120 may be alternated with first screen inserts 110 in a portion of the screen surface nearest the fluid inlet. Thus, the screen surface may process a maximum volume of fluid flowing therethrough. For a lower flow rate, fewer second screen inserts 120 may be installed. For example, at a lower flow rate, second screen inserts 120 may be installed every third, fourth, or fifth row. In still further embodiments, for very low flow rates, only first screen inserts 110 (without second screen inserts 120) may be used to adequately process fluid flowing through the screen surface. In additional embodiments, an alternating arrangement of first and second screen inserts 110 and 120 may be used on a portion of the entire screen surface (e.g., one-quarter or one-half of the screen surface), while on remaining portions of the screen surface, only first screen inserts 110 may be used.

Although previously discussed in reference to the second inserts 120 in accordance with FIG. 2B, FIG. 5, in particular, illustrates how embodiments of the present disclosure provide an increased screening area. As shown, first screen inserts 110 have a width "A" which corresponds with a width of the cell 102 (FIG. 1) in to which the first screen inserts 110 are installed. Similarly, a base portion 122 (FIG. 2B) of second screen insert 120 has a width "A" which also corresponds with a width of the cell 102 into which the second screen inserts 120 are installed. In certain embodiments, the width "A" of the base portion 122 of the second screen insert 120 may be different than the width "A" of the first screen insert 110. Thus, in some embodiments, the first and second screen inserts 110, 120 may be configured to be installed in different cells 102 (FIG. 1) of the screen. In other words, the first screen insert 110 may be sized to fit into specific cells 102 of a screen, while the second screen insert 120 is sized to fit in other cells 102 of the screen. The upper portion 124 of the second insert 120 has a width "B" which is greater than width "A." As previously described, the width "B" may be about twice that of width "A" or even greater in certain embodiments. Therefore, by installing second inserts having an increased width in almost half of the screen frame, the overall screening area of the screen frame may be increased.

While embodiments disclosed herein describe a first screen insert 110 and a second screen insert 120, one of ordinary skill in the art will appreciate that a third screen insert (not shown) or additional screen inserts may also be used so as to provide a multi-tier screening area on a screen. For example, a third screen insert, similar to first and second inserts 110, 120 may be used in conjunction with the first and second inserts 110, 120 on a particular screen 100 (FIG. 1). In this example, a screen surface of the third screen insert is positioned at third height, the screen surface of the first screen insert is positioned at a first height, and the screen surface of the second screen insert is positioned at a second height. The first height, second height, and third height are each different heights. Thus, installation of the first, second, and third inserts in a shaker screen provides a three-tier screening area. The third screen insert may overlap one or both of the first and second inserts. One of ordinary skill in the art will appreciate that four, five, or more different screening inserts with screen surfaces positioned as varying heights may also be used.

Figure 6:
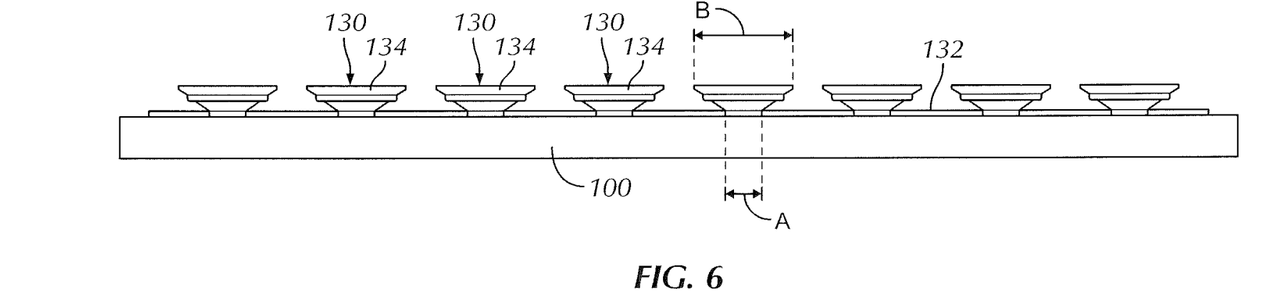
FIG. 6 shows a side view of a screen with screen inserts installed in accordance with one or more embodiments of the present disclosure.
Figure 7:
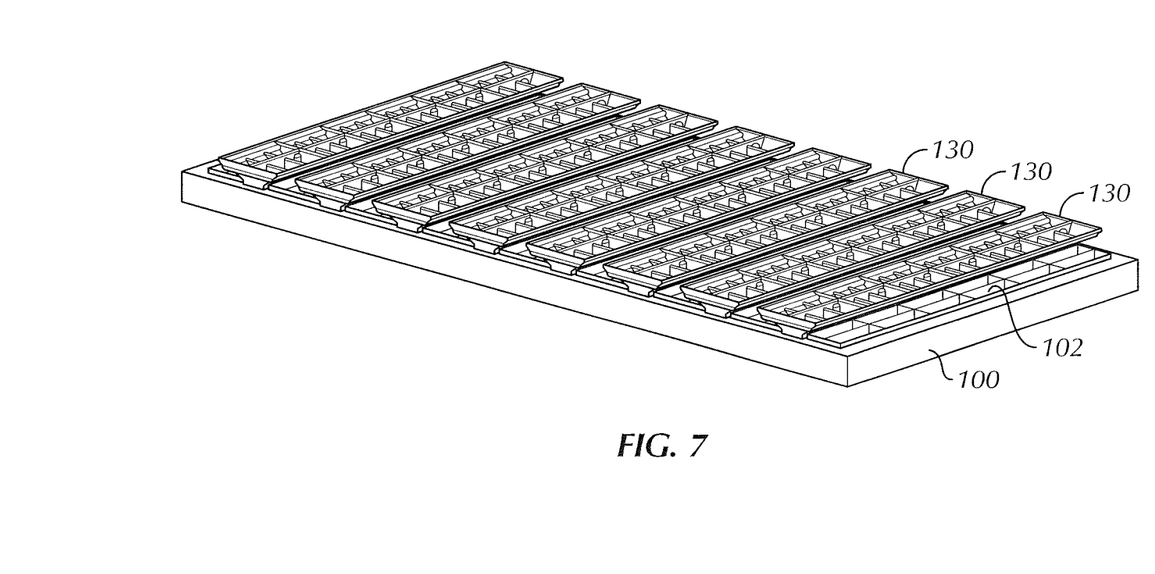
FIG. 7 shows a perspective view of a screen with a plurality of screen inserts installed in accordance with one or more embodiments of the present disclosure.
Figure 8:
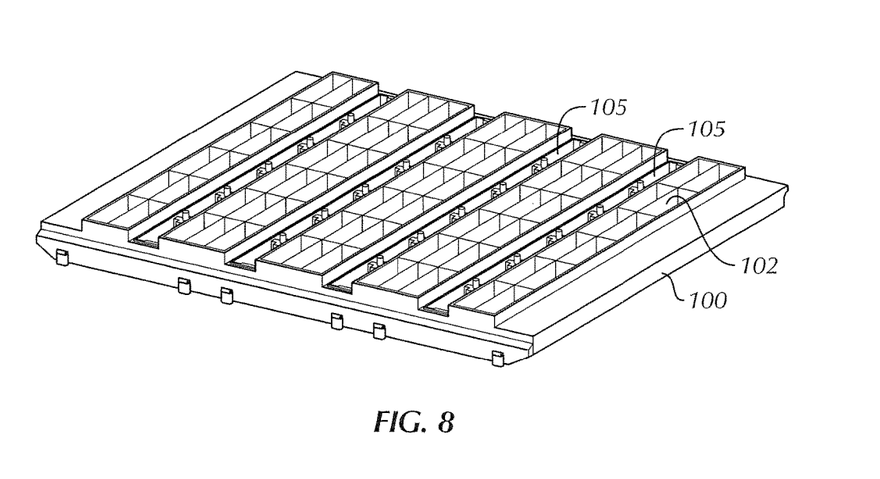
FIG. 8 shows a perspective view of a screen in accordance with one or more embodiments of the present disclosure.

In still other embodiments, a two-tier screening area may be provided by including a single set of inserts. In other words, inserts disposed in certain cells 102 of a screen and positioned at the same height as one another above the screen may be used to create two screening areas, namely, the screen surface of the screen and the screen surface of the single set of inserts. For example, as shown in FIGS. 6 and 7, screen 100 may include a plurality of openings or cells 102 through which fluid and/or particulate matter may flow. One or more screen inserts 130 may be disposed in one or more openings or cells 102 of the screen 100. In some embodiments, the screen inserts 130 may be disposed in openings formed in the screen and configured to receive the screen inserts. For example, as shown in FIG. 8, screen 100 may include a plurality of cells 102 through which sized material may flow and which form a screening surface. The screen 100 may also include a plurality of openings 105 configured to receive a screen insert (e.g. 130 in FIG. 7). As shown in FIG. 8, the screen 100 may be configured to receive a certain number of screen inserts (not shown) in openings 105. For example, FIG. 8 shows four rows of openings 105 configured to receive screen inserts disposed in between sets of cells 102 of the screen. One of ordinary skill in the art will appreciate that screens 100 with other configurations of the number of cells 102 or openings 105 for screen inserts may be used without departing from the scope of embodiments disclosed herein. Further, although the screen 100 in FIG. 8 has designated openings 105 configured to receive one or more screen inserts, one of ordinary skill in the art will appreciate that the screen 100 may not include designated openings 105 configured to receive screen inserts and instead, screen inserts may be disposed in cells 102 in any configuration selected based on a given application.

As shown, the screen 100 may include a plurality of screen inserts 130 forming a set of screen inserts. Each of the screen inserts 130 are the same size, shape, and configuration as either other. Each of the screen inserts 130 has a screen surface 134 and each screen insert 130 is positioned so that a height of each screen surface 134 of each screen insert 130 above a screen surface 132 of the screen 100 is the same, Thus, the screen surfaces 134 of the screen inserts 130 provide a first screening surface and the screen surface 132 of the screen 100 provides a second screening surface.

One of ordinary skill in the art will appreciate that the design or configuration of the screen inserts 130 may vary. For example, screen inserts 130 may include the features described above with respect to first screen inserts 110 and/or second screen inserts 120. The screen inserts 130 may have a constant width "A" or may include a taper from a first width "A" to a second width "B." In some embodiments, while the screen inserts 130 each provide a screen surface 134 at the same (equal) height above the screen surface 132 of the screen 100, the width of any portion of the screen inserts may vary. For example, the width "B" of a first insert may be different from the width "B" of a second insert. Similarly, while the screen inserts 130 each provide a screen surface 134 at the same (equal) height above the screen surface 132 of the screen 100, the length of the screen inserts may vary. For example, the length of a first insert may be different from the length of a second insert. Thus, in some embodiments, the screening area of each insert may vary, but the height of the screening area of the inserts 130 above the screen 100 is constant across the inserts 130.

The screen inserts 110, 120, 130 may be made of any material suitable for a particular application, e.g., oilfield screens, wastewater treatment screens, food processing screens, etc. For example, glass-filled polypropylene may be used in certain embodiments. In other embodiments, glass-filled nylon may be used. Steel reinforcements may also be used inside the screen inserts to add rigidity. Further, the screen inserts 110, 120, 130 formed in accordance with embodiments disclosed herein may include a single opening therethrough, two openings disposed longitudinally or laterally, three openings, four openings, or more. For example, as shown in FIG. 2A, a screen insert 110 may include a single insert with a single opening, or a modular unit 115 unit may include four inserts, each insert having a single opening. As shown in FIG. 7, a screen insert 130 may be a modular unit that includes two rows of a plurality of openings. In other embodiments, a single insert may include two rows of three openings, and a modular unit may include six inserts having two rows of three openings. Thus, while examples are shown in the picture and discussed herein, one of ordinary skill in the art will appreciate that other configuration of screen inserts may be used without departing from the scope of embodiments disclosed herein.

Additionally, a mesh screen (not shown) may be applied to the top of the screen inserts 110,120, and 130. The mesh screen may be a high capacity mesh wire cloth design. The mesh screen may be secured to the screen inserts prior to the inserts being inserted into cells 102 of the screen frame 100. The mesh screen may be fastened to the screen inserts in a number of ways including using fasteners, adhesives, and other known attachment methods. A mesh screen may also be applied to the top of the screen 100 over cells 102 which do not include a screen insert.

In certain embodiments, the mesh screen may be fastened to cover the entire screening surface, i.e., first screen inserts 110, second screen inserts 120, and screen inserts 130 may be covered with a mesh screen. The mesh screen size (i.e., the mesh spacing) may be determined by characteristics of the particular fluid and/or particulate matter to be processed. For example, in wellbore application, the mesh screen size may be determined by characteristics of a particular wellbore. For example, depending on the wellbore characteristics, a coarse mesh screen may be used for drilling a wellbore containing, for example, mostly gumbo (e.g., soft, sticky, swelling clay or sticky shale) and a fine mesh screen may be used for drilling a wellbore containing, for example higher sand content. In other embodiments, different mesh sizes (i.e., mesh screen having different size openings) may be used on different surfaces of the same screen. For example, a first mesh screen size may be used to cover the first screen inserts 110 and a second mesh screen size may be used to cover the second screen inserts 120. In other embodiments, a first mesh screen size may be used to cover an area of the screening surface nearest an inlet of the screen and a second mesh screen size may be used to cover an area of the screening surface nearest an outlet of the screen.

Still further, in certain embodiments, sealing mechanisms (not shown) may be installed between adjacent screen inserts to avoid leak paths between the screen inserts. For example, seals may first be installed in the cells 102 of the screen frame 100 prior to inserting the screen inserts 110 and 120. Thus, when the screen inserts 110, 120, and/or 130 are installed, the seals in the cells 102 may engage the screen inserts 110,120, 130. In other embodiments, the screen inserts 110, 120, 130 may have a seal disposed around an outer periphery which engages a wall of the cells 102 when the screen inserts are installed in the cells 102 of the screen frame 100. Other sealing mechanisms for avoiding leak paths between the screen inserts and the screen frame will be known to those having ordinary skill in the art.

Figure 9:
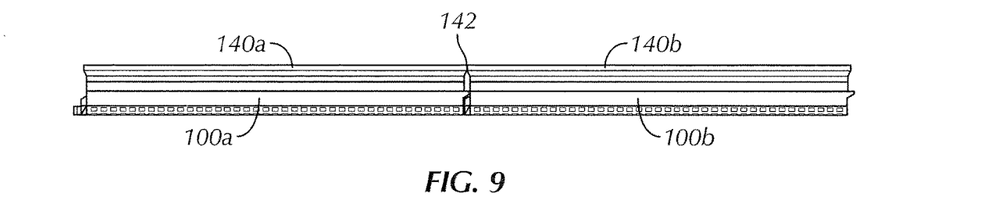
FIG. 9 is a side view of two adjacent screens, each having a screen insert in accordance with embodiments of the present disclosure.

In still other embodiments, the screen inserts (110, 120, 130) and the screen 100 may be configured such that screen inserts disposed in a first screen proximate the periphery of a first screen contact screen inserts disposed in a second screen proximate the periphery of a second screen. As shown in FIG. 9, when two or more screens 100a, 100b are placed next to each other in a vibratory separator (not shown), at least one screen insert 140a on the first screen 100a contacts (shown at 142) at least one screen insert 140b on the second screen 100b along a lengths of the screen inserts 140a, 140b. This configuration may allow solids to stay on top of the inserts 140a, 140b, as the material is flowed over the screens 100a, 100b until they are discharged off the vibratory separator. This may prevent solids or fluids from bypassing the screening surfaces of the screen 100a, 100b and/or the screen inserts 140a, 140b. In some embodiments, a seal may be formed by the contact between the screen inserts 140a, 140b. In other embodiments, a sealing element may be coupled to one or both of the screen inserts 140a, 140b, so as to provide enhanced sealing or further prevent solids from falling between the screen inserts 140a, 140b.

While embodiments described herein discuss "inserts" that may be positioned in or molded to a screen frame, one of ordinary skill in the art will appreciate that a screen frame in accordance with embodiments of the present disclosure may provide a two-tier (or multiple-tier) screening surface without providing inserts. In other words, a screen frame in accordance with the present disclosure may include two (or more) integrally formed screening surfaces. A screen frame may include a first tier and a second tier spaced apart from the first tier. For example, the first tier has a lower screen surface and the second tier has an upper screen surface. The first tier is positioned at a first height above the second tier. A mesh may be applied to the lower screen surface and the upper screen surface. The first and second tiers (or multiple tiers) may be designed similar to the inserts above. For example, the first and second tiers may include sloped portions and a screening surface wider than an opening below the screening surface. Further, the first and second tiers may be arranged in various patterns across the screen frame as discussed above with respect to the inserts.

In some embodiments, a screen in accordance with embodiments disclosed herein may include a screen frame having a first screening surface and a second screening surface. The first screening surface is positioned at a first height above the screen frame. The second screening surface may be formed on the screen frame or may be positioned at a second height above the screen frame. The first screening surface is positioned above the second screening surface. A screening surface area of the first screening surface at the first height above the screen frame may be greater than an area of an opening of the screen frame below the first screening surface. If the second screening surface is positioned at a second height above the screen frame, then the screening surface area of the second screening surface may be greater than an area of an opening in the screen frame below the screening surface. Thus, the surface area of the first and second screening surfaces may be greater than the surface area formed between first and second sides and first and second ends of the screen frame. In some embodiments, the second screening surface may be flush with the screen frame. A mesh may be applied to the first and/or second screening surfaces. In some embodiments, the first and second screen surface may be planar. In other embodiments, one or both of the first and second screen surfaces may be angled or sloped.

In some embodiments, an apparatus includes a screen frame having a plurality of openings and including: a first tier having a first screen surface disposed at a first height above the screen frame; and a second tier having a second screen surface, the second screen surface spaced apart from the first screen surface; and a mesh disposed on the first and second screen surfaces.

Vibratory separators using two-tier screen surfaces described herein may have a single screen deck in certain embodiments. Particularly, older vibratory separators may be retrofitted with two-tier screen surfaces described herein to increase the effective processing capacity. For example, shakers used on offshore platforms, where space on the rig floor is at a premium, may be retrofitted with the two-tier screen surfaces to increase the effective screening area. Likewise, the two-tier screen surfaces may be used on shakers located at land-based rigs. In other embodiments, vibratory separators using the two-tier screen surfaces may have multiple screening decks and multiple two-tier screen surfaces. In certain embodiments, the vibratory separator may include a first screening deck, such as a top screening deck, with a first two-tier screen, and a second screening deck, such as a bottom screening deck, with a second two-tier screen positioned beneath the top screening deck. Further, those of ordinary skill in the art will appreciate that other screening decks, such as a third and/or a fourth screening deck, may be included within the vibratory separator without departing from the scope of the present disclosure.

In some embodiments, a two-tier (or multi-tier) screen as disclosed herein may be positioned in a vibratory separator at or near the feed end of the separator while a single level or conventional screen is disposed proximate the discharge end of the separator. One of ordinary skill in the art will appreciate that, depending on the configuration of a given vibratory separator, one or more two-tier (or multi-tier) screens may be used in various positions on one or more decks off the vibratory separator. Embodiments of the present disclosure provide a shaker screen with an increased open screening area, and thus greater overall fluid capacity. The two-tier or two-tiered screening area may improve fluid capacity of the screen. For example, for a screen that has 5.5 square feet of non-blanked area, a two-tiered screen insert screen may increase the non-blanked area by 40% to 7.7 square feet or by 60% to 8.8 square feet. In a shaker with four screens, this would provide an increase of 8.8 square feet from 22 to 30.8 square feet or 13.2 square feet to 35.2 square feet. One of ordinary skill in the art will appreciate that the screening area of a screen with screen inserts as disclosed herein may increase by any other amount, including less than 40 percent, greater than 60 percent or between 40 and 60 percent based on the configuration of the screen inserts and the number of inserts installed in the screen. The horizontal screening surfaces (e.g., the first and second screen inserts) should have a higher effective screening area and allow more fluid to pass through, thereby providing increased effective processing capacity of the screen.

Although only a few example embodiments have been described in detail above those skilled in the art will readily appreciate that many modifications are possible in the example embodiments without materially departing from scope of the present application. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An apparatus comprising:
a screen frame having a plurality of openings forming a frame screen surface;
a first screen insert having a first end disposed in a first opening of the plurality of openings of the screen frame such that a second end of the first screen insert, opposite to the first end, extends outwardly away from the first opening and the frame screen surface of the screen frame, the first screen insert having a height defined between the first and second ends of the first screen insert,
wherein the first screen insert comprises at least one opening extending unobstructed across the entire height of the first screen insert from the first end to the second end of the first screen insert such that a first insert screen surface of the first screen insert is positioned at a first height above the frame screen surface of the screen frame; and
a second screen insert having a first end disposed in a second opening of the plurality of openings of the screen frame such that a second end of the second screen insert, opposite to the first end, extends outwardly away from the second opening and the screen frame, the second screen insert having a height defined between the first and second ends of the second screen insert,
wherein the second screen insert comprises at least one opening extending the entire height of the second screen insert from the first end to the second end of the second screen insert such that a second insert screen surface of the second screen insert is positioned at a second height and the second height of the second insert screen surface is different from the first height of the first insert screen surface.

2. The apparatus of claim 1, wherein the first and second screen inserts are disposed in adjacent openings of the screen frame.

3. The apparatus of claim 1, wherein a screen mesh covers the first and second screen surfaces of the first and second screen inserts.

4. The apparatus of claim 1, wherein a width of an upper portion of the second screen insert is greater than a width of an upper portion of the first screen insert.

5. The apparatus of claim 1, wherein the first screen insert is a modular unit comprising two or more individual first screen inserts coupled together.

6. The apparatus of claim 1, wherein the second screen insert is a modular unit comprising two or more individual second screen inserts coupled together.

7. The apparatus of claim 1, wherein the first screen insert is coupled to the second screen insert to form a modular unit.

8. The apparatus of claim 1, wherein at least one of the first screen insert and the second screen insert comprises a dove-tail configuration which corresponds with a dove-tail slot formed in the screen frame.

9. The apparatus of claim 1, wherein the first and second screen inserts are arranged in an alternating pattern along a length of the screen frame.

10. The apparatus of claim 1, further comprising one or more seals disposed between the first and second inserts and the screen frame.

11. The apparatus of claim 1, further comprising:
a first screen mesh size covering a first portion of the first insert screen surface of the first screen insert; and
a second screen mesh size covers a second portion of the second insert screen surface of the second screen insert.

12. The apparatus of claim 1, further comprising:
a second screen frame having an upper screen surface and a plurality of openings, the second screen frame disposed adjacent the screen frame; and
a second screen insert disposed in a second opening of the plurality of openings of the second screen frame, the second screen insert having a screen surface positioned at a second height above the upper screen surface of the second screen frame.

13. The apparatus of claim 12, wherein at least a portion of the first screen insert disposed in the screen frame contacts at least a portion of the second screen insert disposed in the second screen frame.

* * * * *